United States Patent [19]
Munch

[11] 3,732,883
[45] May 15, 1973

[54] FLUIDIC LINEAR ACCELEROMETER
[75] Inventor: Otto R. Munch, West Allis, Wis.
[73] Assignee: Johnson Service Company, Milwaukee, Wis.
[22] Filed: Jan. 26, 1970
[21] Appl. No.: 5,651

[52] U.S. Cl. .............................. 137/824, 73/515
[51] Int. Cl. .................................. F15c 1/14
[58] Field of Search ............... 137/81.5; 73/515, 73/516

[56] References Cited

UNITED STATES PATENTS

| | | |
|---|---|---|
| 3,541,865 | 11/1970 | Brown ............................ 137/81.5 X |
| 3,452,767 | 7/1969 | Posingies .......................... 137/81.5 |
| 3,509,896 | 5/1970 | Bowles ............................ 137/81.5 |
| 3,272,215 | 9/1966 | Bjornsen et al .................... 137/81.5 |
| 3,276,464 | 10/1966 | Metzger .......................... 137/81.5 |
| 3,310,985 | 3/1967 | Belsterling et al. ................ 137/81.5 |
| 3,450,145 | 6/1969 | Colston ........................... 137/81.5 |
| 3,513,710 | 5/1970 | Bates et al. ...................... 137/81.5 |
| 3,529,612 | 9/1970 | Rausch ........................... 137/81.5 |

Primary Examiner—Samuel Scott
Attorney—Andrew, Sceales, Starke and Sarvall and Arnold J. De Angelis

[57] ABSTRACT

This disclosure includes a fluidic linear accelerometer in the form of a looped conduit of substantially lineal configuration having a fluid input supply and terminating in a pair of opposed ends. A summing impact modulator is connected to the conduit ends to provide an amplified fluidic signal. The density of the fluid flowing in one of the two lineal passageways forming the loop is changed with respect to the other. A pressure differential is established which is dependent upon the linear acceleration in the lineal direction and the difference in densities.

14 Claims, 5 Drawing Figures

PATENTED MAY 15 1973 3,732,883

INVENTOR
OTTO R. MUNCH

BY
Andrus, Sceales, Starke & Sawall
Attorneys 3,732,883

FLUIDIC LINEAR ACCELEROMETER

BACKGROUND OF INVENTION

This invention relates to a fluidic linear accelerometer and particularly to such an accelerometer providing a fluidic signal in accordance with the linear acceleration of a fluid conducting apparatus.

Generally, accelerometers have employed mechanism wherein mechanically movable parts are positioned in accordance with the acceleration of the apparatus to produce a related output signal. Although such devices have provided satisfactory results, they have certain distinct disadvantages from the standpoint of expense, reliability and the like.

A highly satisfactory accelerometer is shown in applicant's copending application entitled "Fluidic Accelerometer," filed on the same day as this application and assigned to the same assignee. As more fully disclosed therein, a flow passageway means is provided with an intermediate input supply means from which the passageway means extends to terminate in a pair of opposite end output means. A differential fluid response means is interconnected to the end output means to compare the signal thereat and establish an output which is in relation to the acceleration of the flow passageway means. The continuous supply of fluid which is maintained to the passageway means results in a highly sensitive and substantial fluidic output signal.

SUMMARY OF PRESENT INVENTION

The present invention is particularly directed to a fluidic linear accelerometer wherein a fluid flows in two coextending lineal passageways of a loop with distinct different densities in one passageway relative to the other. A fluidic sensing means is connected to the conducting elements to detect the differential fluidic signal. Since the fluids in the respective lineal passageways have significantly different densities and acceleration of the fluid is dependent upon its density, a differential pressure is created at the fluidic sensing means.

In a particularly novel aspect of the invention, the conducting elements are formed in a substantially lineally extending loop configuration having long, straight coextending sides and arranged to encompass a minimum area. A forced change is established in the density of the fluid flowing in one long side of the loop configuration with respect to the fluid in the other. For example, restrictor means can be provided to change a liquid flow into a gaseous flow. The density may also be changed by heating or cooling of the input fluid. If the loop is accelerated along its longitudinal dimension (with a component parallel to the long, straight sides) a pressure differential is established which is dependent upon the linear acceleration.

A summing impact modulator connected to the ends of the conducting loop will detect the change in pressure in accordance with the difference in the density and the acceleration. The summing impact modulator provides a very sensitive means for detecting the change in pressure and thus provides an output signal in accordance with the change in the linear acceleration of the flow passageway means.

BRIEF DESCRIPTION OF DRAWING

The drawing furnished herewith illustrates the best mode presently contemplated by the inventor for carrying out the subject invention and further discloses the above advantages and features as well as others which will be readily understood from the following description.

In the drawing.

DESCRIPTION OF ILLUSTRATED EMBODIMENTS

Figure 1:
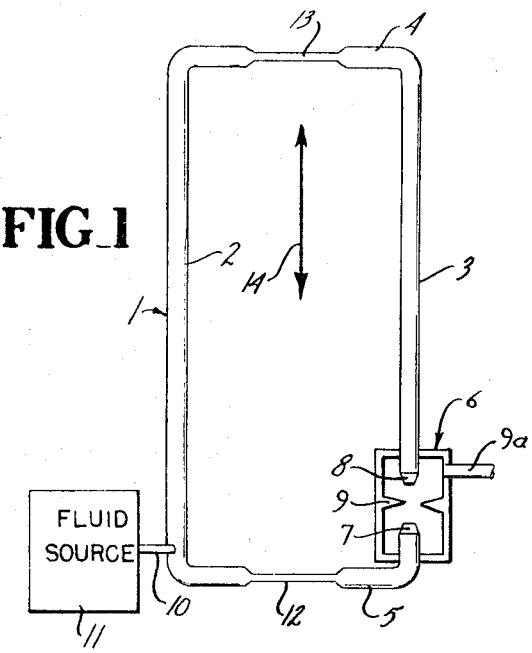
FIG. 1 is a diagrammatic illustration of a linear accelerometer employing restrictor means to change the density of the fluid.

Referring to the drawing and particularly FIG. 1, a linear accelerometer is schematically illustrated including a split fluid conducting loop or line 1 in a narrow rectangular configuration. The rectangular conducting line 1 includes opposite, parallel long sides 2 and 3 interconnected by a pair of relatively short sides 4 and 5. A summing impact modulator 6 constructed in accordance with the teaching of the Bjornsen U.S. Pat. No. 3,272,215 and/or the related U.S. Pat. No. 3,388,713 is connected to detect a differential pressure between conduit ends 7 and 8. The summing impact modulator 6 is shown inserted in the long side 3 immediately adjacent the lower end and the connection to side 5. The modulator 6 includes the conduit ends defining a corresponding pair of input nozzles 7 and 8 connected respectively to the ends within side 3. A central wall 9 with a collector orifice defines an output chamber about the nozzle 8. A signal proportional to the fluidic input signals at nozzles 7 and 8 is established in the output chamber and at the output tap or line 9A. An intermediate supply line 10 interconnects a source of fluid 11 to line 1. Each of the short sides 4 and 5 is defined by or includes a fluid restrictor 12 and 13, respectively. In the operation, the fluid flows from long side 2 of the loop through restrictors 13 and 12 to opposite ends of the other long side 3. In passing through the restrictors 13 and 12, the fluid changes to a corresponding lower density which is supplied to the nozzles 8 and 7 respectively of the summing impact modulator 6. The apparatus of FIG. 1 is sensitive to acceleration in the direction of the longitudinal dimension of sides 2 and 3. In the absence of acceleration and neglecting the pressure losses and supply impedance and input impedance of the fluid amplifier, the pressures at the input sides of the restrictors 12 and 13 are essentially equal to the supply pressure and the pressure at each restrictor output side will be essentially equal to the pressure at the corresponding summing impact modulator nozzle 7 or 8. If the loop is accelerated in the direction of the longer sides 2 and 3, the pressure $P_1$ at the input side of the restrictor 13 approximately equals the pressure to the input side of restrictor 12, $P_3$, reduced by the effect of acceleration which is equal to the acceleration $C$ times the supply density $D_s$ times the distance $L$ between the two resistors 12 and 13. The density change across the restrictors is essentially the same such that neglecting the input impedance of the fluid amplifier, the pressure $P_2$ to the right side of restrictor 13 equals that to the right of restrictor 12, pressure $P_4$ less the acceleration factor which is approximately equal to the product of the length, acceleration and density $D_a$ of fluid in leg 3 and modulator 6. The flow to the nozzles 7 and 8 is equal to the restrictor flow which is approximately proportional to the difference in pressure across the corresponding restrictors 12 and 13 from which the differential flow to nozzles 7 and 8 may be calculated. In equation form, the above relations are:

$$P_1 = P_3 - D_s LC$$
$$P_2 = P_4 - D_a LC$$
$$P_1 - P_2 = P_3 - P_4 - L(D_s - D_a)C$$
$$Q_4 = K(P_3 - P_4)$$
$$Q_1 = K[P_3 - P_4 - L(D_s - D_a)C]$$
$$\Delta Q = Q_4 - Q_1 = KL(D_s - D_a)C$$

wherein the given equal signal (=) indicates the quantities are approximately or essentially equal to each other.

$Q$ = flow in the related restrictor,
$L$ = length of a long side of the lines 2 or 3,
$D$ = fluid density in the related line, and
$C$ = the acceleration in the assumed direction of arrow 14.

The differential flow to the summing impact modulator 6 results in a corresponding change in the output flow signal at the output line 9 and thus provides a fluidic signal directly proportional to the acceleration.

As more fully disclosed in applicant's previously identified copending application, the loop configuration is also sensitive to angular acceleration, with the magnitude of the output related to the enclosed area. The narrow sides are therefore made as short as possible to minimize the enclosed area and therefore minimize the sensitivity to angular acceleration. For example, the loop may be an inch long and a tenth of an inch wide.

The use of restrictors 12 and 13, as shown, will generally be employed where the supply is a liquid phase and the flow to the fluidic amplifier is a gas phase. Similar fluid phases can, however, be employed throughout the system, for example, by employing the system shown in FIG. 2.

Figure 2:
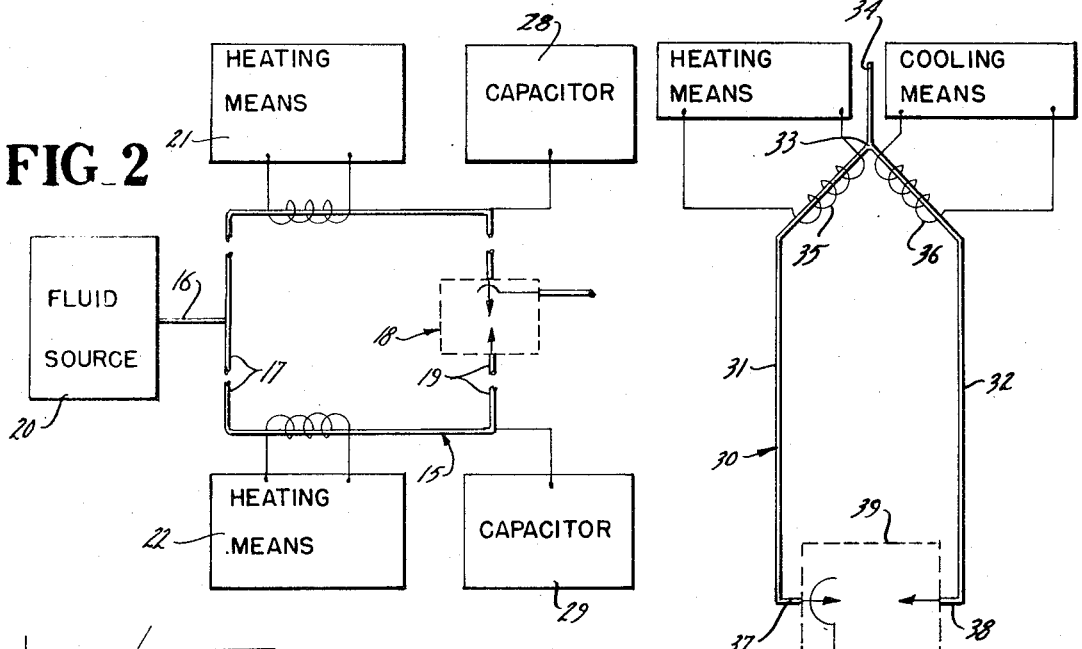
FIG. 2 is a diagrammatic illustration similar to FIG. 1, but greatly reduced in length, and illustrating an alternative construction for changing the fluid density in a linear accelerometer.

Referring particularly to FIG. 2, the illustrated embodiment of the invention employs a generally planar rectangular loop 15 having relatively long sides 17, 19 interconnected by the narrow sides. In FIG. 2, a primary supply line 16 is interconnected to the one long side 17 and a summing impact modulator 18, shown schematically, or other suitable fluid amplifier is interconnected to the opposite long side 19. The primary supply line 16 is connected to a supply 20 of fluid with gas or liquid at a preselected temperature. Each of the short sides of the coil 15 is similarly provided with a heat exchanger 21 and 22, both of which cool or both of which heat fluid passing through the short sides, to establish a difference in the density of the fluid in the respective legs. For purposes of illustration, units 21 and 22 are identified as heating means. One exchanger 21 or 22 may be completely eliminated as long as the basic requirement of a density difference is established.

The differential pressure applied to the summing impact modulator 18 is then defined by the equation:

$$\Delta P = (D_{16} - D_{19})LC$$

which indicates the pressure input to the modulator and the output will, therefore, be directly proportional to the difference in the density times the acceleration. This equation neglects the affect of the supply impedance, the pipe resistance and the input impedance of the modulator which generally can be neglected for practical purposes, or suitable compensation can be made by proper selection of the conduit size and construction of the supply and/or summing impact modulator.

Figure 3:
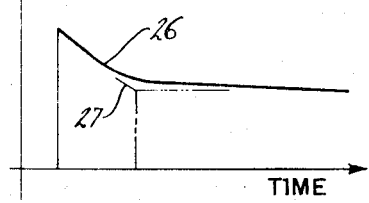
FIG. 3 is a typical graphical illustration of the step input response of a linear accelerometer such as shown in FIG. 2.

The step input response of the accelerometer shown in FIG. 2, employing gas as a fluid, will be generally as shown in FIG. 3. A system with heating exchange means 21 and 22 responds to an acceleration change, as shown by curve 25, with an initial sharp decrease in the pressure and a gradual increase to a final increased pressure differential. A system with cooling exchanger means 21 and 22 responds to the same acceleration change, as shown by curve 26, with an initial sharp increase in the differential pressure above the final pressure differential to which it generally decreases with time. Additional overshoot can be minimized by selection of a conduit size which minimizes harmonic oscillations in the fluid flow. The time constant which is determined by the slope of the step response curve, as shown at 27, is determined by the tube volume and the flow. For any given loop, the time constant may be increased by connection of fluid capacitors 28 and 29 to the discharge side of the respective heat exchangers 21 and 22.

As previously noted, the acceleration detection loop is sensitive to angular acceleration generally in accordance with the enclosed area. An embodiment of the invention is shown in FIG. 4 which particularly minimizes the enclosed area.

Figure 4:
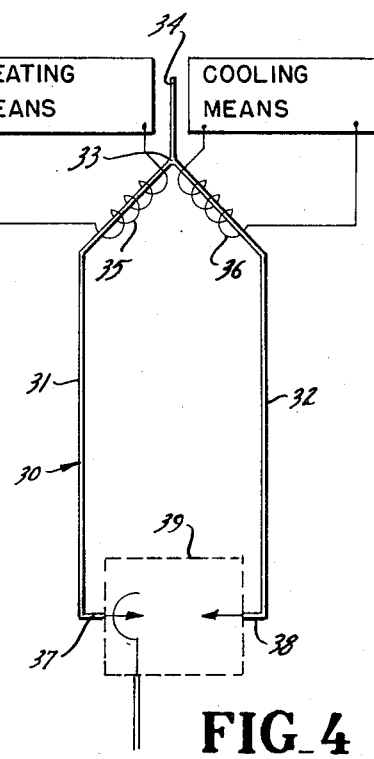
FIG. 4 is a diagrammatic illustration of a further embodiment of the present invention.

In FIG. 4, a fluid conductor 30 is bent or formed into a generally rectangular configuration with a pair of long parallel sides 31 and 32 connected at the extremities by a V-shaped end 33. The apex of end 33 is connected to a fluid source line 34 and provides a continuous flow through the parallel sides of the configuration. A heating coil unit 35 and a cooling coil unit 36 are similarly coupled to the end 33 on the opposite sides of input line 34 to establish a different density in the legs. If desired, heating on one side only or cooling on one side only would also provide the necessary difference in densities. The opposite extremities or ends 37 and 38 of the parallel sides 31 and 32 are connected to the opposed nozzles of an impact modulator 39.

Acceleration of the conductor loop in the longitudinal direction of the parallel sides 31 and 32 establishes a differential pressure between the signal ends 37 and 38 in the same manner as heretofore discussed.

Figure 5:
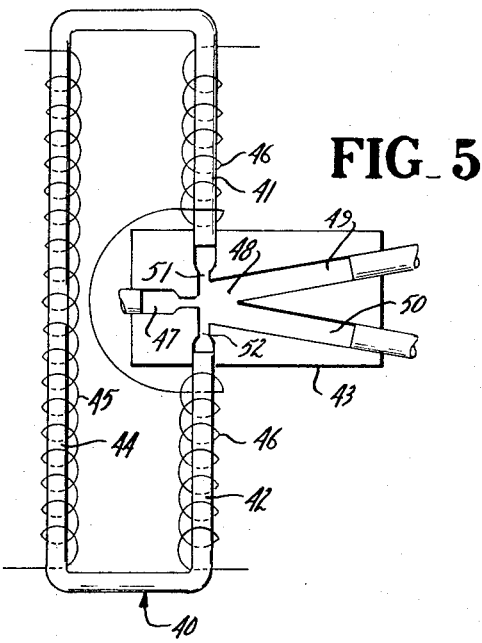
FIG. 5 illustrates a further embodiment of the invention employing a beam deflection or wall attachment sensing unit.

A still further embodiment of the invention is shown in FIG. 5 employing a split, rectangular loop 40. The loop 40 includes one side which is split to define a pair of aligned fluid conductors 41 and 42 terminating in the output or signal ends. In FIG. 5, the signal ends of the conductors 41 and 42 are applied to control a beam deflector or wall attachment-type fluidic device 43. The opposite ends of the conductors are connected by short ends to a continuous adjacent conductor 44. Heat exchanger coils 45 and 46 are shown coiled around the conductors 41, 42 and 44 to vary the density of the fluid in conductor 44 relative to that in the respective legs 41 and 42.

Generally, the device 43 includes a power nozzle 47 establishing a main fluid stream within an interaction chamber 48. A pair of output passageways 49 and 50 are provided in the chamber wall in opposed relation to the power nozzle 47, with the main fluid stream. Control nozzles 51 and 52 are mounted in substantially opposed and spaced relation to the opposite sides of the main power stream adjacent the power nozzle 47 and connected respectively to the output or free ends of conductors 41 and 42.

The split loop 40 is again sensitive to the linear acceleration in the direction of the long dimension of the loop with the differential pressure related to the density difference and the acceleration. In FIG. 5, a continuous input supply is not connected to the loop, as in the previous embodiments. The fluid moves through the loop with the supply derived from the adjacent interaction chamber.

Thus, assume that device 43 is a beam deflection type fluid amplifier, coil 46 is a cooling means and coil 45 is a heating means. At zero acceleration, the device 43 may be balanced to have equal pressure outputs on both ports 49 and 50. If the assembly is now accelerated in the direction of conduit 42 to conduit 41 (vertically up on the drawing FIG. 5, a circulation is established in the loop, aspirating fluid from the interaction chamber 48 into nozzle 52 and exhausting it from nozzle 51 providing a control stream out of nozzle 51. This control stream deflects the power stream towards output port 50, establishing an increased output at port 50 and a decreased output at port 49. The sensitivity and linearity of the device can, however, be improved by connecting a continuous supply to the sensing loop as in FIG. 2.

The present invention thus provides a pure fluid accelerometer for detecting linear acceleration and, in particular, producing an output which is responsive to acceleration of the device.

Various modes of carrying out the invention are contemplated as being within the scope of the following claims which particularly point out and distinctly claim the subject matter which is regarded as the invention.

I claim:

1. A linear fluidic accelerometer having an output dependent upon the acceleration thereof, comprising a flow passageway means having a pair of generally parallel legs connected to a pair of end output means, said flow passageway means being movably mounted for movement in the same direction as said parallel legs extend, control means establishing a different density of fluid in the first of said parallel legs from the density of fluid in the second of said parallel legs, and a differential fluid signal responsive means connected to said pair of end output means establishing an output related to the acceleration of the flow passageway means in the direction of the legs.

2. The linear fluidic accelerometer of claim 1, wherein the signal responsive means includes a pure fluid amplifying means connected to the end output means and establishing an output signal indicative of the linear acceleration.

3. The linear fluidic accelerometer of claim 1, having a fluid supply connected to said passageway means to establish a predetermined fluid flow to the output means.

4. The linear fluidic accelerometer of claim 1, wherein said control means are heat exchange means.

5. The linear fluidic accelerometer of claim 1, having a fluid supply means connected to supply fluid at a preselected temperature to said passageway means, and said control means includes a heat exchange means to the opposite sides of the supply means and changing the temperature of the fluid therethrough to correspondingly change the density.

6. The linear fluidic accelerometer of claim 5, having fluid capacitor means connected to the passageway means on the discharge side of the heat exchangers.

7. The linear fluidic accelerometer of claim 1, wherein said passageway means defines a rectangle having said parallel legs defining the long side thereof, said rectangle having minimal length sides to enclose a minimal area and thereby reduce the response to angular movement of the passageway means.

8. The linear fluidic accelerometer of claim 7, having a liquid supply line connected to one leg and having restrictor means in said sides of the passageway means to the opposite sides of the input supply line to change the density of the liquid between said supply line and the end output means and thereby produce a differential fluid signal at said pair of output means.

9. The linear fluidic accelerometer of claim 1, wherein said flow passageway means includes a pair of immediately adjacent conduits terminating at one end in said output means, and having a fluid supply connected to the other ends of said conduits, and means for establishing a temperature difference in fluid in said conduits relative one to the other.

10. The linear fluidic accelerometer of claim 9, wherein the signal responsive means includes a pure fluid amplifying means connected to said end output means and establishing an output signal indicating the linear acceleration.

11. The linear fluidic accelerometer of claim 9, wherein said temperature difference establishing means control the density of the fluid in said immediately adjacent conduits.

12. The linear fluidic accelerometer of claim 1, wherein said passageway means is generally rectangular with elongated side portions defined by said parallel legs extending in the direction of acceleration and connected by relatively short end portions, an input fluid supply means being connected to one side portion and the signal responsive means being connected to the opposite side portion, and control means being connected in the end portions and operative to change the density of the fluid between the input means and the end output means.

13. The fluidic apparatus of claim 12, wherein said supply is a gas source providing a constant supply of gas at a preselected temperature at said input means, said control means are a heat exchange means through which said gas flows with a substantial difference in density between the entering gas and the emitted gas.

14. The fluidic apparatus of claim 12, wherein said supply is a liquid source providing a supply of liquid at a preselected temperature at said input means, said control means are heat exchange means through which said liquid flows with a difference in density between the entering liquid and the emitted liquid.

* * * * *

UNITED STATES PATENT OFFICE
CERTIFICATE OF CORRECTION

Patent No. 3,732,883        Dated May 15, 1973

Inventor(s) OTTO R. MUNCH

It is certified that error appears in the above-identified patent and that said Letters Patent are hereby corrected as shown below:

Column 6, Line 22, after "and" insert --- said control means ---;
(Claim 8)

Column 6, Line 32, after "and" insert --- said control means includes ---;
(Claim 9)

Column 6, Line 51, after "and" insert --- said ---;
(Claim 12)

Signed and sealed this 27th day of November 1973.

(SEAL)
Attest:

EDWARD M. FLETCHER, JR.  
Attesting Officer

RENE D. TEGTMEYER  
Acting Commissioner of Patents